(12) United States Patent
Schweitzer et al.

(10) Patent No.: US 12,472,572 B2
(45) Date of Patent: Nov. 18, 2025

(54) METHOD FOR PRODUCING A SURGICAL INSTRUMENT FOR GRASPING AND/OR HOLDING AND/OR GUIDING A NEEDLE

(71) Applicant: Aesculap AG, Tuttlingen (DE)

(72) Inventors: Tom Schweitzer, Tuttlingen (DE); Corvin Motz, Pfullendorf (DE); Andreas Deutschendorf, Spaichingen (DE)

(73) Assignee: Aesculap AG, Tuttlingen (DE)

( * ) Notice: Subject to any disclaimer, the term of this patent is extended or adjusted under 35 U.S.C. 154(b) by 138 days.

(21) Appl. No.: 18/021,767

(22) PCT Filed: Aug. 19, 2021

(86) PCT No.: PCT/EP2021/073062
§ 371 (c)(1),
(2) Date: Feb. 16, 2023

(87) PCT Pub. No.: WO2022/038234
PCT Pub. Date: Feb. 24, 2022

(65) Prior Publication Data
US 2024/0024974 A1    Jan. 25, 2024

(30) Foreign Application Priority Data
Aug. 21, 2020  (DE) .................... 10 2020 210 664.9

(51) Int. Cl.
*B23K 1/00*    (2006.01)
*A61B 17/062*  (2006.01)
(Continued)

(52) U.S. Cl.
CPC .......... *B23K 1/0008* (2013.01); *A61B 17/062* (2013.01); *B23K 1/20* (2013.01); *B23K 35/3033* (2013.01); *A61B 2017/00526* (2013.01)

(58) Field of Classification Search
CPC ................. B23K 1/0008; B23K 33/00; A61B 2017/00526; A61B 17/062; A61B 2017/2825; A61B 201/00526
See application file for complete search history.

(56) References Cited

U.S. PATENT DOCUMENTS 2,706,987 A * 4/1955 Bramstedt ............ A61B 17/062
606/147
3,078,551 A * 2/1963 Patriarca ............... F22B 37/104
228/183
(Continued)

FOREIGN PATENT DOCUMENTS

| CN | 109875488 A | 6/2019 |
|----|-------------|--------|
| DE | 29713631 U1 | 10/1997 |

(Continued)

OTHER PUBLICATIONS

Meta-Braze, "Nickel Base Brazing Alloys", https://www.meta-braze.com/products/base-metal-brazing-alloys/nickel-based-brazing-alloys, May 17, 2019 (Year: 2019).*

(Continued)

*Primary Examiner* — Erin B Saad
*Assistant Examiner* — Carlos J Gamino
(74) *Attorney, Agent, or Firm* — Christopher A. Rothe; CM Law

(57) ABSTRACT

A method for producing a surgical instrument for grasping and/or holding and/or guiding a needle includes: a) producing a first arm part and a second arm part, each having a distal holding jaw with a recess and a solder deposit region; b) inserting hard metal inserts into the recesses in the distal holding jaws; c) joining the first arm part and the second arm part so that the first arm part and the second arm part are pivotable relative to one another at a joint; d) filling the (Continued)

solder deposit regions with solder; and e) soldering the hard metal inserts in the distal holding jaws using the solder.

18 Claims, 1 Drawing Sheet

(51) Int. Cl.
  *B23K 1/20* (2006.01)
  *B23K 35/30* (2006.01)
  *A61B 17/00* (2006.01)

(56) References Cited

U.S. PATENT DOCUMENTS

| | | | | |
|---|---|---|---|---|
| 5,810,881 | A * | 9/1998 | Hoskin | A61B 17/062 |
| | | | | 81/421 |
| 6,253,989 | B1 * | 7/2001 | Bennett | B23K 33/006 |
| | | | | 228/139 |
| 6,254,597 | B1 * | 7/2001 | Rizoiu | B23K 26/146 |
| | | | | 604/35 |
| 2005/0228441 | A1 * | 10/2005 | Wood | A61B 17/062 |
| | | | | 606/205 |
| 2013/0046336 | A1 * | 2/2013 | Blumenkranz | A61B 17/29 |
| | | | | 606/205 |
| 2014/0100564 | A1 * | 4/2014 | Garrison | A61B 18/085 |
| | | | | 156/60 |
| 2014/0243850 | A1 * | 8/2014 | Sadaka | A61B 34/30 |
| | | | | 606/130 |
| 2022/0410245 | A1 * | 12/2022 | Schweitzer | A61B 17/062 |

FOREIGN PATENT DOCUMENTS

| | | | | |
|---|---|---|---|---|
| DE | 19733036 C1 * | 6/1999 | | A61B 17/062 |
| DE | 202004008169 U1 * | 9/2004 | | A61B 17/062 |
| JP | 62006772 A * | 1/1987 | | B23K 1/18 |
| JP | S6285079 A | 4/1987 | | |
| JP | 2008164108 A * | 7/2008 | | |
| WO | 2021175931 A1 | 9/2021 | | |

OTHER PUBLICATIONS

Tillmann et al., "Brazing of cutting materials", Advances in Brazing Science, Technology and Applications Woodhead Publishing Series in Welding and Other Joining Technologies 2013, pp. 423-471, https://doi.org/10.1533/9780857096500.3.423 (Year: 2013).*

Search Report received in International Application No. PCT/EP2021/073062 dated Nov. 19, 2021, with translation, 5 pages.

Office Action received in Chinese Application No. 202180051277.5 dated Jul. 23, 2025, with translation, 11 pages.

* cited by examiner

METHOD FOR PRODUCING A SURGICAL INSTRUMENT FOR GRASPING AND/OR HOLDING AND/OR GUIDING A NEEDLE

CROSS-REFERENCE TO RELATED APPLICATION(S)

This application is the United States national stage entry of International Application No. PCT/EP2021/073062, filed Aug. 19, 2021, and claims priority to German Application No. 10 2020 210 664.9, filed Aug. 21, 2020. The contents of International Application No. PCT/EP2021/073062 and German Application No. 10 2020 210 664.9 are incorporated by reference herein in their entireties.

FIELD

The invention relates to a method for producing a surgical instrument for grasping and/or holding and/or guiding a needle, in particular a surgical needle.

BACKGROUND

Special surgical instruments, in particular surgical needle holders, are used for grasping, holding and guiding a surgical needle.

Surgical needle holders have two arm parts which are mirror images of one another and which are pivotably mounted relative to one another at an articulation or articulation point. Usually, the arm parts each have a distal holding or clamping jaw containing a hard metal insert. The hard metal inserts are inserted into recesses in the holding or clamping jaws. Owing to the hard metal inserts, it is advantageously possible to slow down the occurrence of profile wear. To hold needles without any slipping or tilting, the hard metal inserts can have a cross-shaped profile, it being possible for the profile to be pressed in the form of pyramids or ground in a pyramidal checkered pattern with diamond tools.

Usually, the hard metal inserts are connected to hardened arm parts intended for production of surgical needle holders, in a so-called brazing process using a silver braze. A disadvantage here, however, is that brazing requires temperatures which are problematic with respect to microstructure transformations and, accordingly, also with respect to corrosion resistance. This is especially the case when the arm parts are made of a martensitic material. Another disadvantage is that silver hard brazes themselves can exhibit black discoloration over time owing to reprocessing of the instruments.

Alternatively, the hard metal inserts can be connected to arm parts intended for production of surgical needle holders, in a so-called high-temperature vacuum brazing process during a hardening process. A disadvantage here, however, is that the different coefficients of thermal expansion for a base or carrier material used for the arm parts (generally stainless steel) and for a hard metal used for the hard metal inserts have a significant effect owing to the large temperature differences during the hardening process, and so relative movements in a hardening furnace can occur even with correct positioning of the hard metal inserts into the recesses in the holding and clamping jaws.

SUMMARY

It is an object of the invention to provide a method for producing a surgical instrument for grasping and/or holding and/or guiding a needle, in particular a surgical needle, by means of which disadvantages occurring in methods of the type in question are partially or completely avoided and which especially results in a surgical instrument for grasping and/or holding and/or guiding a needle, in particular a surgical needle, having increased stability and corrosion resistance.

This object is achieved by a method having the features as claimed in independent claim 1. Preferred embodiments of the invention are subject matter of dependent claims 2 to 13. The wording of all the claims is hereby incorporated in the content of the present description by express reference.

The invention relates to a method for producing a surgical instrument for guiding and/or holding and/or grasping a needle, in particular a surgical needle. The surgical instrument is preferably a surgical needle holder or surgical tweezers. The method comprises, especially in chronological order, the following steps:

providing a first arm part and a second arm part, wherein the first arm part and the second arm part each have a distal holding jaw having a recess and each have a depot, in particular in the form of a cavity, in a free end or within a free end of the distal holding jaw, inserting a hard metal insert into the recess in the distal holding jaw of the first arm part and inserting a hard metal insert into the recess in the distal holding jaw of the second arm part, joining or connecting the first arm part and the second arm part, preferably wherein the first arm part and the second arm part are pivotably mounted relative to one another at an articulation or articulation point in the joined or connected state, filling the depot of the first arm part and filling the depot of the second arm part with a braze in each case, and brazing the hard metal insert inserted into the recess in the distal holding jaw of the first arm part to the first arm part and brazing the hard metal insert inserted into the recess in the distal holding jaw of the second arm part to the second arm part, with the aid of the braze in each case.

The expression "depot" is to be understood in the context of the present invention to mean a depot, i.e., a storing or storage mechanism, designed or configured to be filled with a braze and to keep or store the braze after filling, i.e., to have it available.

In the context of the present invention, the expression "distal" is intended to mean pointing away from a center of a human or animal body or located further away from a center of a human or animal body.

In the context of the present invention, the expression "proximal" is intended to mean pointing to a center of a human or animal body or located closer to a center of a human or animal body.

The invention is especially distinguished by the following advantages:

By using depots integrated in free ends of the distal holding jaws, metering of the amount of braze required for brazing and control of the flow of braze during the brazing process is achievable with particular advantage. As a result, the use of excess braze, of oversized hard metal inserts and of braze stops is unnecessary.

The metering of the amount of braze can advantageously be defined via a volume of the depot. The control of the flow of braze is preferably based on capillary action, by means of which the braze can be drawn into a braze gap present between the inserted hard metal inserts and the distal holding jaws, the capillary effect breaking at the end of the braze gap and there being no further flow of the braze. As a result, the problems described in the introduction in connection with an excess of braze and an uncontrolled flow of braze can be avoided with particular advantage.

For example, there is no need to grind off excess braze and/or protruding hard metal inserts. Instead, any grinding process subsequent to the brazing process can, for example, be limited to dimensional adjustment between the hard metal inserts and the distal holding jaws and to the removal of any braze residues present. As a result, the amount of costly hard metal used can be reduced.

The method according to the invention is thus distinguished overall by improved process reliability and, in particular, by a reduction in manual work steps. As a result, higher product quality is achievable.

Moreover, by avoiding scrap and reducing the work required, the production costs can be reduced.

Lastly, it is advantageous that more stable surgical instruments for grasping and/or holding and/or guiding a needle can be produced by means of the method according to the invention, by the method making it possible to reduce stress peaks and to thus reduce the risk of breakage.

The expression "hard metal insert" is to be understood in the context of the present invention to mean an insert which comprises a hard metal, in particular as the main component, or consists of a hard metal.

The expression "hard metal" is to be understood in the context of the present invention to mean a metal-matrix composite material in which hard materials present as small particles are held together by a matrix composed of metal or an alloy. As a result, hard metals are somewhat less hard than pure hard materials, but distinctly tougher. On the other hand, they are harder than pure metals, alloys and hardened steel.

Preferably, the first arm part and the second arm part are mirror images of one another. Preferably, the first arm part has a first grip part, in particular a first finger opening, at a proximal end, and the second arm part has a second grip part, in particular a second finger opening, at a proximal end.

Preferably, the first arm part and the second arm part each comprise a stainless steel as base or carrier material. In particular, the first arm part and the second arm part can each consist largely or entirely of a stainless steel. The stainless steel is preferably a corrosion-resistant stainless steel, preferably a corrosion-resistant, martensitic stainless steel, particularly preferably a corrosion-resistant, martensitic stainless steel having the material number 1.4021.

Hard metal inserts preferably used are hard metal inserts which comprise a metal matrix composed of cobalt and/or nickel and a hard material selected from the group consisting of tungsten carbide (WC), titanium carbide (TiC), titanium nitride (TiN), niobium carbide, tantalum carbide, vanadium carbide and mixtures thereof. In particular, the hard metal inserts can each have a nickel content of 8% by weight to 20% by weight and a metal carbide content, in particular tungsten carbide content, of 80% by weight to 92% by weight, based on the total weight of a particular hard metal insert.

Preferably, the hard metal inserts also have a profiled, in particular serrated or toothed, surface, preferably a surface having a cross-shaped profile and/or pyramidal checkered pattern. As a result, gripping and/or holding and/or guiding of a needle without any tilting and/or slipping is achievable with particular advantage.

Furthermore, the hard metal inserts can have an encircling chamfer.

Particularly preferably, the hard metal inserts, for example having a toothed profile, an encircling chamfer and a shape complementary to the shapes of the recesses in the distal holding jaws, are produced by a near-net-shape forming process.

The surgical instrument produced by means of the method according to the invention can comprise a locking mechanism (lock) in the form of locking arms having latching hooks, which locking arms extend away in the vicinity of the abovementioned grip parts and point toward one another. When the distal holding jaws are in the closed state, said latching hooks of the locking arms can form-fittingly latch with one another, such that a thread between the distal holding jaws, or a corresponding needle, automatically remains firmly held. This locking (lock) can be released by a user operating the surgical instrument as a result of the grip parts being further pressed together and being moved slightly apart along the plane of the holding jaws. The surgical instrument and the distal holding jaws can then be opened.

In one embodiment of the invention, when carrying out step b), the hard metal inserts are form-fittingly inserted into the recesses in the distal holding jaws. As a result, a high degree of accuracy in fitting and positioning is achievable. In particular, displacements of the hard metal inserts can in this way be avoided completely or at least to a large extent.

In a further embodiment of the invention, when carrying out step b), a nose shaped form-fitting section of the hard metal inserts is inserted into a complementary (i.e., shape-complementary) region of the recess in the distal holding jaws and form-fittingly held thereby. The nose shaped form-fitting section allows, in principle, displacement between hard metal insert and arm part or distal holding jaw while carrying out step e) (owing to differing material expansion of the hard metal and of a base or carrier material, preferably stainless steel, of the arm parts). Nevertheless, the nose shaped form-fitting section can ensure, with particular advantage, correct alignment, in particular centering, of the hard metal inserts.

In a further embodiment of the invention, the depots are each in the form of a cavity, in particular in the form of an elongate or elongated, in particular channel-shaped, cavity. Particularly preferably, the cavity extends in the axial direction of the distal holding jaw. The cavity can, in principle, have a polygonal, in particular triangular, quadrangular, pentagonal or hexagonal, cross-section. Preferably, however, the cavity has a cornerless, in particular circular, oval or elliptical, cross-section. A particularly specific control of flow of braze when carrying out step e) is advantageously achievable especially by an elongate or elongated design of the cavity.

In a further embodiment of the invention, the cavity has an inner diameter of 0.3 mm to 2 mm, preferably 0.8 mm to 1.2 mm, and/or a length of 4 mm to 15 mm, preferably 7 mm to 12 mm. The amount of braze for carrying out step e) can be controlled with particular advantage via the inner diameter and/or the length of the cavity. Apart from that, the advantage mentioned in the preceding paragraph applies mutatis mutandis.

In a further embodiment of the invention, step c) is carried out between steps b) and e), in particular between steps b) and d).

To carry out step c), the first arm part and the second arm part can, for example, be screwed together at the articulation or articulation point with the aid of a screw, in particular a locking screw.

In a further embodiment of the invention, when carrying out step d), the depots are each filled with the braze via an inlet opening formed on the end face at the free end of the distal holding jaws. The depots can, for example, be filled with the braze with the aid of a metering aid, in particular a syringe.

In a further embodiment of the invention, step d) is carried out between steps b) and e), in particular between steps c) and e).

In a further embodiment of the invention, the braze used is a nickel braze, i.e., a nickel alloy or nickel-containing alloy (according to EN ISO 17672), in particular selected from the group consisting of Ni600, Ni610, Ni612, Ni620, Ni630, Ni631, Ni650, Ni700, Ni710, Ni720, Ni800 and mixtures thereof.

The nickel braze Ni600 is preferably a nickel alloy having a melting temperature range from 980° C. to 1060° C., the nickel alloy consisting of the following constituents:
14% by weight of chromium,
4.5% by weight of silicon,
3.1% by weight of boron,
4.5% by weight of iron,
0.75% by weight of carbon, and
nickel and optionally impurities in the remainder.

The nickel braze Ni610 is preferably a nickel alloy having a melting temperature range from 980° C. to 1070° C. and consisting of the following constituents:
14% by weight of chromium,
4.5% by weight of silicon,
3.1% by weight of boron,
4.5% by weight of iron, and
nickel and optionally impurities in the remainder.

The nickel braze Ni612 is preferably a nickel alloy having a melting temperature of 1055° C. and consisting of the following constituents:
15% by weight of chromium,
3.6% by weight of boron, and
nickel and optionally impurities in the remainder.

The nickel braze Ni620 is preferably a nickel alloy having a melting temperature range from 970° C. to 1000° C. and consisting of the following constituents:
7% by weight of chromium,
4.5% by weight of silicon,
3.1% by weight of boron,
3% by weight of iron, and
nickel and optionally impurities in the remainder.

The nickel braze Ni630 is preferably a nickel alloy having a melting temperature range from 980° C. to 1040° C. and consisting of the following constituents:
4.5% by weight of silicon,
3.1% by weight of boron, and
nickel and optionally impurities in the remainder.

The nickel braze Ni631 is preferably a nickel alloy having a melting temperature range from 980° C. to 1070° C. and consisting of the following constituents:
3.5% by weight of silicon,
1.9% by weight of boron, and
nickel and optionally impurities in the remainder.

The nickel braze Ni650 is preferably a nickel alloy having a melting temperature range from 1080° C. to 1135° C. and consisting of the following constituents:
19% by weight of chromium,
10% by weight of silicon, and
nickel and optionally impurities in the remainder.

The nickel braze Ni700 is preferably a nickel alloy having a melting temperature of 875° C. and consisting of the following constituents:
11% by weight of phosphorus, and
nickel and optionally impurities in the remainder.

The nickel braze Ni710 is preferably a nickel alloy having a melting point of 890° C. and consisting of the following constituents:
14% by weight of chromium,
10% by weight of phosphorus, and
nickel and optionally impurities in the remainder.

The nickel braze Ni720 is preferably a nickel alloy having a melting temperature range from 880° C. to 950° C. and consisting of the following constituents:
25% by weight of chromium,
10% by weight of phosphorus, and
nickel and optionally impurities in the remainder.

The nickel braze Ni800 is preferably a nickel alloy having a melting temperature range from 980° C. to 1010° C. and consisting of the following components:
7% by weight of silicon,
23% by weight of manganese,
4.5% by weight of copper, and
nickel and optionally impurities in the remainder.

The aforementioned nickel brazes are particularly preferred according to the invention, since the melting temperature ranges or melting temperatures thereof are compatible with the temperatures required for hardening of the arm parts, in particular joined arm parts. As a result, when carrying out step e), hardening of the arm parts, in particular joined arm parts, is also achievable at the same time with particular advantage.

In a further embodiment of the invention, when carrying out step e), the braze exits in each case from an outlet opening in the depot, which outlet opening opens into a bottom of the recess in the distal holding jaws. Preferably, when carrying out step e), the braze passes from the depots into the bottom of the recess in the distal holding jaws under the action of a capillary force. This in turn means that the braze from the depot can spread uniformly in braze gaps formed between the hard metal inserts and the distal holding jaws, without escaping from the braze gaps. Furthermore, brazing of the distal holding jaws to one another while step e) is being carried out can be avoided.

In a further embodiment of the invention, the inlet opening and the outlet opening are arranged acute-angledly or perpendicularly to one another.

Preferably, to carry out step e), the arm parts, in particular joined arm parts, are clamped or suspended by means of a suspension device in such a way that the free ends of the distal holding jaws with the depots are oriented upwards. As a result, when carrying out step e), the braze can spread particularly well in braze gaps formed between the hard metal inserts and the distal holding jaws, owing to liquefaction of said braze and with the assistance of gravity and preferably capillary action.

Further preferably, step e) is carried out in a vacuum furnace or protective gas furnace, for example with a hydrogen or argon atmosphere.

Particularly preferably, step e) is carried out in a high-temperature brazing process, in particular in accordance with DIN 8593-7.

Especially through step e), hardening of the arm parts is also achievable with particular advantage. In particular, the arm parts, or the surgical instrument produced by means of the method according to the invention, can achieve here an HRC hardness (Rockwell hardness) of 42 HRC to 50 HRC. An independent hardening step, in particular before carrying out step e), is therefore not necessary. This is a (further)

simplification of the process flow, meaning that time and costs in particular can be saved.

In a further embodiment of the invention, after step e) has been carried out, the method further comprises a step f) removing the depots.

In a further embodiment of the invention, when carrying out step f), the depots are each removed by breaking a predetermined breaking line or predetermined breaking point/thin spot. The predetermined breaking lines or predetermined breaking points/thin spots each preferably extend in the circumferential direction of the distal holding jaws. Especially preferably, the predetermined breaking lines or predetermined breaking points/thin spots are each formed between the free end of the distal holding jaws that comprises the depot, and a depot-free section of the distal holding jaws that adjoins the free end of the distal holding jaws. The predetermined breaking lines or predetermined breaking points/thin spots can, for example, be in the form of perforations, notches or scratches. The predetermined breaking lines or predetermined breaking points/thin spots advantageously allow simple manual removal of the (external) depots by means of breaking, in particular without the use of additional tools and in particular without the risk of damaging the arm parts and therefore the surgical instrument to be produced.

Alternatively, when carrying out step f), the free ends of the distal holding jaws can be ground off as far as the predetermined breaking lines or predetermined breaking points/thin spots.

Furthermore, after step e), in particular after step f), the method can comprise a further step g) grinding the hard metal inserts used and/or the distal holding jaws. As a result, tolerance differences between the hard metal inserts and the arm parts/distal holding jaws can be leveled out with particular advantage and, in particular, any residual braze can be removed.

Further advantages and aspects of the invention will become apparent from the claims and from the following description of preferred exemplary embodiments of the invention, which are explained on the basis of a production example and on the basis of figures and associated descriptions thereof.

DETAILED DESCRIPTION

Figure 1:
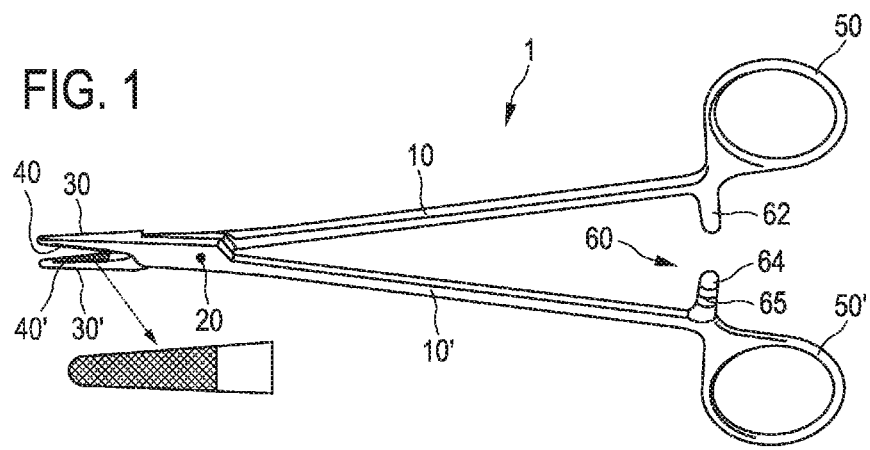
FIG. 1: one embodiment of a surgical instrument which can be produced by means of the method according to the invention.

The surgical instrument 1 depicted schematically in FIG. 1 is a surgical needle holder.

The surgical needle holder has a first arm part 10 and a second arm part 10' which are pivotably mounted relative to one another at an articulation point 20. Preferably, the first arm part 10 and the second arm part 10' are mirror images of one another.

Both the distal end of the first arm part 10 and the distal end of the second arm part 10' each have a holding jaw 30, 30' (so-called distal holding jaws). The distal holding jaws 30, 30' each have a hard metal insert 40, 40'. The hard metal inserts 40, 40' are each form-fittingly inserted in a recess in the distal holding jaws 30, 30'.

The proximal ends of the arm parts 10 and 10' each have a grip part 50, 50' in the form of a finger opening.

Located between the distal holding jaws 30, 30' and the two grip parts 50, 50' is a locking mechanism 60 which is formed by two locking arms 62, 64. The first locking arm 62 protrudes from the first arm part 10 toward the second arm part 10'. The second locking arm 64 protrudes from the second arm part 10' toward the first arm part 10, and so, by means of latching hooks (not depicted) attached to the first locking arm 62 and latching hooks 65 attached to the second locking arm 64, it is possible to latch or lock the two locking arms 62 and 64 and hence the surgical needle holder 1. The latching hooks of the first locking arm 62 and the latching hooks 65 of the second locking arm 64 are designed in such a way that form-fitting locking is achieved when the grip parts 50, 50' are pressed together. The latching hooks can, for example, be shark tooth-shaped.

Figure 2:
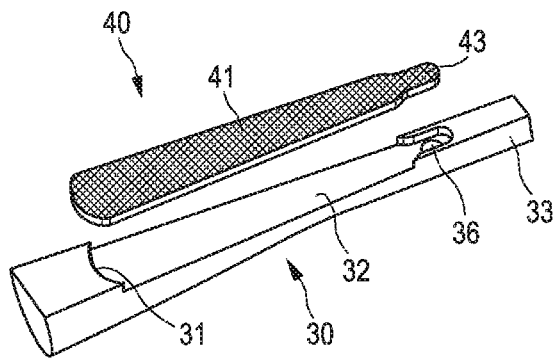
FIG. 2: a detailed illustration of a hard metal insert and a distal holding jaw of a precursor of a surgical instrument according to FIG. 1 in the unassembled state.

FIG. 2 shows schematically a detailed illustration of a hard metal insert 40 and a distal holding jaw 30 of a precursor of the surgical instrument 1 depicted in FIG. 1 in the unassembled state.

The hard metal insert 40 is preferably planar and preferably has a cross-shaped profile 41. Furthermore, the hard metal insert 40 has a nose shaped form-fitting section 43.

The distal holding jaw 30 has a recess 31 complementary to the shape of the hard metal insert 40. Formed in the free end 33 of the distal holding jaw 30 is a hollow depot 35 (see FIG. 3), with an outlet opening 36 of the depot 35 opening into the bottom 32 of the recess 31.

Figure 3:
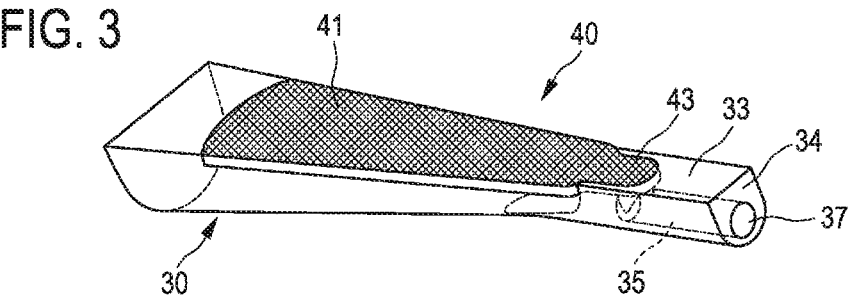
FIG. 3: a detailed illustration of a hard metal insert and a distal holding jaw of a precursor of a surgical instrument according to FIG. 1 in the assembled state.

FIG. 3 shows schematically a detailed illustration of a hard metal insert 40 and a distal holding jaw 30 of a precursor of the surgical instrument 1 depicted in FIG. 1 in the assembled state.

The depot 35 is preferably in the form of an elongate or channel-shaped cavity which extends in the axial direction of the distal holding jaw 30. On the end face 34 of the free end 33 of the distal holding jaw 30, the depot 35 has an inlet opening 37 for filling the depot 35 with a braze.

With regard to further features and advantages of the hard metal insert 40 and the distal holding jaw 30, full reference is made to the description relating to FIG. 2.

Lastly, the advantages of the method according to the invention shall be summarized again as follows: by means of a near-net-shape forming process, it is possible for the hard metal inserts to be already produced with a matching outer shape and an encircling chamfer in a tool-dependent manner.

EXAMPLE

Method of Producing a Surgical Needle Holder

The arm parts of the surgical needle holder were produced from a sheet of stainless steel (1.4021) having a thickness of 5.5 mm. Thereafter, milling was carried out to produce a recess for an articulation closure and also one recess each in the region of the distal holding jaws of the arm parts. Furthermore, drilling was carried out to create hollow depots in the free ends of the distal holding jaws.

The hard metal inserts to be inserted into the recesses in the distal holding jaws were produced by means of a near-net-shape forming process. The hard metal inserts thus produced each had a toothed profile, an encircling chamfer on the toothed profile, and a matching outer shape for insertion into the recesses in the distal holding jaws. It was possible to produce relevant hard metal inserts by means of pressing or MIM (metal injection molding), for example. The hard metal inserts thus produced were then sintered.

The hard metal inserts were then form-fittingly inserted into the recesses in the distal holding jaws. Thereafter, the arm parts were fixed with a rivet pin and locked by means of a locking mechanism.

To braze the hard metal inserts to the arm parts, the depots were filled to the top edge with a high-temperature nickel-based braze in accordance with EN ISO 17672 by means of a metering device or a syringe. Any excess braze was removed.

The surgical needle holder was then suspended in a suspension device, specifically in such a way that the free ends of the distal holding jaws of the arm parts were oriented upwards. The needle holder thus suspended was placed in a hardening furnace.

A high-temperature vacuum brazing process was then carried out in accordance with DIN 8593-7. As a result, what occurred here was not only brazing of the hard metal inserts to the arm parts of the surgical needle holder, but also, at the same time, hardening of the base or carrier material (stainless steel) of the instrument. The base or carrier material achieved a hardness of 42 HRC to 50 HRC.

The depot-containing free ends of the distal holding jaws were then removed. Said ends were removed by breaking predetermined breaking lines, which were formed in the circumferential direction of the distal holding jaws and between the depot-containing free ends and adjoining depot-free holding jaw sections.

Thereafter, the surgical needle holder was ground to level out tolerance differences between the hard metal inserts and the base or carrier material of the needle holder and to remove any residual braze.

Lastly, the surface of the surgical needle holder was subjected to a surface finish.

The invention claimed is:

1. A method for producing a surgical instrument for grasping, holding or guiding a needle, comprising the steps of:
   a) providing a first arm part and a second arm part, wherein the first arm part and the second arm part each have a distal holding jaw having a recess and each have a depot in a free end of the distal holding jaw;
   b) inserting a first hard metal insert into the recess in the distal holding jaw of the first arm part and inserting a second hard metal insert into the recess in the distal holding jaw of the second arm part;
   c) joining the first arm part and the second arm part, wherein the first arm part and the second arm part are pivotably mounted relative to one another at an articulation in a joined state;
   d) filling the depot of the first arm part and filling the depot of the second arm part with a braze in each case; and
   e) brazing the first hard metal insert inserted into the recess in the distal holding jaw of the first arm part to the first arm part and brazing the second hard metal insert inserted into the recess in the distal holding jaw of the second arm part to the second arm part, with the aid of the braze in each case,
   wherein, after step e), the method further comprises a step
   f) removing the depots.

2. The method according to claim 1, wherein, when carrying out step b), the first and second hard metal inserts are form-fittingly inserted into the recesses in the distal holding jaws.

3. The method according to claim 1, wherein, when carrying out step b), nose shaped form-fitting sections of the first and second hard metal inserts are inserted into complementary regions of the recesses in the distal holding jaws and form-fittingly held thereby.

4. The method according to claim 1, wherein the depots are each in the form of a cavity that is elongated.

5. The method according to claim 4, wherein the cavity has an inner diameter of 0.3 mm to 2 mm.

6. The method according to claim 1, wherein step c) is carried out between steps b) and e).

7. The method according to claim 1, wherein the braze is a nickel braze.

8. The method according to claim 1, wherein, when carrying out step d), the depots are filled with the braze via inlet openings formed on end faces at the free ends of the distal holding jaws.

9. The method according to claim 1, wherein step d) is carried out between steps b) and e).

10. The method according to claim 8, wherein, when carrying out step e), the braze exits from outlet openings in the depots, the outlet openings opening into bottoms of the recesses in the distal holding jaws.

11. The method according to claim 10, wherein the inlet opening and the outlet opening of each depot are arranged acute-angledly or perpendicularly to one another.

12. The method according to claim 1, wherein, when carrying out step f), the depots are removed by breaking the distal holding jaws.

13. The method according to claim 12, wherein the distal holding jaws are broken between the free ends that comprise the depot and depot-free sections of the distal holding jaws that adjoin the free ends.

14. The method according to claim 7, wherein the nickel braze is selected from the group consisting of Ni600, Ni610, Ni612, Ni620, Ni630, Ni631, Ni650, Ni700, Ni710, Ni720, Ni800 and mixtures thereof.

15. The method according to claim 4, wherein each cavity has a cornerless cross-section.

16. The method according to claim 4, wherein each cavity has a length of 4 mm to 15 mm.

17. The method according to claim 1, wherein step c) is carried out between steps b) and d).

18. The method according to claim 1, wherein step d) is carried out between steps c) and e).

* * * * *